Dec. 20, 1966  C. E. M. HANSEL  3,292,276
TEACHING MACHINES

Filed Jan. 4, 1965  6 Sheets-Sheet 1

INVENTOR
CHARLES E. M. HANSEL

BY
Watson, Cole, Grindle & Watson

ATTORNEYS

INVENTOR
CHARLES E.M. HANSEL

ATTORNEYS

FIG. 4D.

Dec. 20, 1966  C. E. M. HANSEL  3,292,276
TEACHING MACHINES

Filed Jan. 4, 1965  6 Sheets-Sheet 6

INVENTOR
CHARLES E.M. HANSEL
BY
Watson, Cole, Grindle & Watson
ATTORNEYS

United States Patent Office 3,292,276
Patented Dec. 20, 1966

3,292,276
TEACHING MACHINES
Charles Edward Mark Hansel, 4 Acacia Drive,
Altrincham, England
Filed Jan. 4, 1965, Ser. No. 423,042
Claims priority, application Great Britain, Mar. 17, 1964,
11,282/64
11 Claims. (Cl. 35—9)

This invention relates to machines for teaching and of the kind including programme selection apparatus to determine a programme of questions to be set to a pupil, apparatus for presenting the questions to the pupil, mechanism by which the questions are so presented in sequence in accordance with a selected programme, manually operable mechanism by which the pupil can record answers to the questions and means for presenting the correct answer when a wrong answer is recorded.

An object of the invention is to provide an improved teaching machine of the above kind which will tend to impress upon the mind of a pupil more certainly and permanently the correct answer to any question in a programme to which he initially records an incorrect answer or otherwise indicates that he does not know the correct answer, as well as having other advantages.

According to one feature of the invention a teaching machine of the kind referred to includes means for presenting the correct answer when the incorrect answer is recorded in reply to a question in a main programme, or when a pupil otherwise indicates that he does not know the correct answer, as by depressing a key indicating this fact, and, after the pupil has then recorded the correct answer, for automatically initiating the presentation by the machine of a subsidiary programme of questions which includes the question to which the incorrect answer has been recorded in the main programme or to which the pupil has indicated that he did not know the correct answer.

As will hereinafter appear the means for presenting the questions and/or the answers in a machine according to the invention may present such questions and/or answers in visible and/or audible form. For convenience herein however, except when reference is being made specifically to one or other of these methods of presenting questions and/or answers, the means for presenting the questions will be referred to as "question display apparatus" and the means for presenting the answers will be referred to as "answer display apparatus" while references to display a question or displaying an answer are to be understood as including presentation of a question and/or answer in visible or audible form.

A machine according to the invention may also include means for again displaying the correct answer if and when an incorrect answer is again recorded in a subsidiary programme to the question to which the incorrect answer was recorded in the main programme and, after the pupil has then again recorded the correct answer, for then initiating a repetition of the subsidiary programme or for initiating a second different subsidiary programme of questions again including the same question.

Thus, with a machine according to the invention, if and when the wrong answer is recorded to a question in the main programme, or when the pupil otherwise signifies, as by depressing a key that he does not know the correct answer, not only is the right answer displayed to the pupil but the pupil has to record the right answer to cause the continued operation of the machine and during such continued operation, the question to which the pupil initially indicated in one way or another that he did not know the answer is then again displayed to the pupil in a different context from that in which it was first displayed in the main programme (and preferably amongst questions from the earlier part of the main programme which are arranged to be relatively easy and which the pupil has shown himself capable of answering correctly). The presence in the pupil's mind of the incorrect response previously given thus tends to be eliminated and the correct response to the question to be learnt.

The arrangement may be such that the question to which the answer was initially not known or to which the wrong answer was initially recorded, may in the subsidiary programme first be presented again after one such easy item and then (assuming it is correctly answered) presented a further number of times following increasing numbers of easy items so that the correct answer has to be retained in the pupil's memory for increasingly long periods of time and following increasing numbers of interposed items.

Moreover, the machine may include means by which, when a pupil has recorded correctly the answers to a series of questions the same questions will be displayed to the pupil in a new routine which may involve, for example:

(1) A re-arrangement of the order in which the questions are displayed, (2) Exclusion from the series of the easier questions and re-display only of the more difficult questions, (3) Introduction of timing apparatus which imposes a limitation on the time allowed to a pupil to answer a question and/or the total time taken to answer the series of questions.

In any event, the machine may include means which operate to indicate visually the fact that a correct answer has been recorded and/or that an error has been made, as the case may be, and/or that an answer has not been known to a question or to two or more questions in a set of questions constituting a programme, and/or to indicate at the end of the programme whether errors have been made or not and/or whether more practice is required.

When the machine includes means by which indications of the pupils performance can be given at the end of a sequence of questions, these means may include means for displaying instructions to the pupil based on his performance in the preceding routine whereby he may, for example, be instructed to aim for accuracy or to aim for more speedy responses. In addition the nature of the pupil's performance in a particular routine may cause the machine automatically to proceed to display a further routine or to revert back to an earlier routine or repeat the same routine should the pupil's performance make one or other of these courses desirable.

Thus, the machine may include recording means responsive to the total time taken by a pupil to complete the main programme (and any subsidiary programme or programmes which may be interposed in the main programme due to wrong answers being recorded), and means for displaying the time taken to complete the main programme and/or give some other indication of the "standard" achieved by the pupil in completing the main programme, e.g. by displaying the words "too slow" or "moderate" or "good." Such timing mechanism, which is preferably capable of being brought into and out of operation at will, may also be constructed and arranged so that if the correct answer is given to any question displayed, within a predetermined time of display the machine operation normally to cause display of the next question but if the correct answer is given but not within the predetermined time the machine displays a signal indicating that the operator has taken too long to answer the question. In the latter case the arrangement may be such that the subsidiary programme of questions, as displayed following the recording of a wrong answer, is displayed, and is repeated if necessary until the pupil has answered the particular question within the predetermined time.

Means such as display means bearing the words "too slow" or the like may also be provided to indicate when the initiation of the subsidiary programme is for this reason and not because of an incorrect answer.

Thus, for example, when a pupil has successfully learnt the answers to a set of questions in a programme so that he can answer the questions, however presented, without a mistake, the timing mechanism may be put into operation to provide a "timed" routine indicating whether he can give the correct answers within a predetermined time and/or to provide a stimulus or form the basis of competition in quick answering of the questions by several pupils.

The means by which the programme to be presented can be selected may vary but in one arrangement the machine includes means for supporting one or more templates or stencils in position for display, the templates or stencils bearing the questions and answers of a selected main programme, and means, for example, electric lamps, for displaying the questions in turn, a selector device which causes the display of the questions (and the answers when required) in a determined sequence constituting a main programme, and also closes selectively circuits (herein called answer circuits) leading to manually operable means by which a pupil can record the answers he thinks correct, one or more devices (herein called for convenience commutator devices), for example of the plug and socket or manually operable type, arranged to effect appropriate electrical connections selectively between the answer circuits and, the manually operable means, and relay apparatus in such manner that, if the manually operable means is operated to record the correct answer to a question displayed, the selector device will operate to cause display of the next question of the main programme but if a wrong answer is recorded, or a pupil operates a control (if provided) indicating that the answer is not known, the relay apparatus will initiate the display first of the answer to the question which the pupil answered wrongly or not at all and then, after the pupil has recorded the correct answer, the display of a subsidiary programme of questions selected by the selector device from the questions constituting the main programme and the question that was initially wrongly answered or not answered. It will usually be preferable for the subsidiary programme to consist first of questions already correctly answered by the pupil and terminating with the incorrectly answered questions. Moreover, should the pupil make any errors in or not know the answer to any question in such a subsidiary programme he may be presented with the correct answer, which he then has to record before the subsidiary programme proceeds, while should he make an error when presented with the original incorrectly answered question at the end of the subsidiary programme, the subsidiary programme may be repeated so that he cannot proceed with the main programme until he has established that he can respond correctly to that question.

Further, if and when a pupil records the wrong answer to a question, the machine may cause illumination of the word "wrong", "no" or for example, a cross, in addition to illumination of the correct answer. Similarly, means may be provided for the machine to cause illumination of the word "correct" or a "tick" ($\sqrt{}$) when the pupil records a correct answer.

In any event in the case of visual presentation of questions and answers each of a number of templates or stencils concerned with different programmes of questions and answers would be capable of being selectively applied to the machine in the display position or positions and the commutator device or devices would be constructed or adjustable so as to make the appropriate connections for the display of the correct answers if and when incorrect answers were given to any of the questions thus to be displayed.

The series of questions constituting a main programme would normally be arranged in a particular sequence, e.g. in order of difficulty or in a progressive sequence as in a multiplication table in which the answer to each question can be worked out from or has some association with the preceding one. Then if and when a wrong answer is recorded to a question the repetition of that question in the subsidiary programme would appear after the pupil's attention had been diverted from it by answers selected from the part of the main programme to which he had recorded correct answers, while, if and when a pupil had answered all the questions in the main programme when presented in the particular sequence referred to, the same questions could be presented in a different "haphazard" sequence to ascertain if the pupil can answer them correctly when so presented. Moreover, the presentation of the questions first in a simple, logical or "progressive" sequence and then in a haphazard sequence may be effected automatically. For example, the machine may be arranged to display questions first in logical or progressive order followed by a routine in which the same set of questions is displayed in haphazard order. Thus the machine may be provided with switches such that when operated, after a pupil has answered correctly a series of questions displayed in a particular order, the machine will then proceed to display the same set of questions in a different order. Further, the arrangement may be such that when the pupil has demonstrated his ability to answer correctly all the questions in a sequence when displayed either in logical or haphazard order, the machine will automatically bring its timing apparatus into operation and again display the same set of questions, also in haphazard order similar to or different from any previous order to ascertain whether the pupil can answer each of the items and/or the complete set of items within a predetermined time. Moreover, the time allotted the pupil for a particular series of questions or for each question in a series may be modified at the end of the presentation of the series in relation to the pupil's performance so that he is allotted more time or less time to answer questions in the subsequent series. With such an arrangement, if the pupil makes one or more errors in the answers to the set of questions when presented in "logical" order the machine may be arranged so that a signal such as "more practice required" may be displayed whereas if he answers the set without error a signal such as "error free" may be displayed and the machine switches to the display in haphazard order, at the end of which, if all answers have been correct, it may display a signal such as "error free—try to be quicker" or words to that effect. The machine then switches to the display in haphazard order with the answers to the questions timed, at the end of which a signal such as "good" or "error free but not fast enough" as the case may be, may be displayed. With such an arrangement if the pupil makes an error during either haphazard presentation, the machine may automatically switch back to the display in logical order. Thus a pupil can be tested and/or instructed by the machine in his knowledge of a programme of questions from the point where he has no knowledge or imperfect knowledge of the correct answers to the point at which he can give the correct answers to each of the questions quickly, in whatever "context" the question appears.

The machine will be provided with a "Start" button or the equivalent which when depressed starts the operation of the machine and which will re-start the machine at the beginning of a programme if depressed again when a programme has been completed. In addition, the machine may have a "Re-set" key or the equivalent which when operated at an intermediate point in a programme, restores the machine to the position for starting a programme when the "Start" key is next depressed so that, if a programme is left unfinished by one pupil it can be reset in readiness for another pupil to start from the beginning of that programme or another selected programme while it can also be set back to zero at any point in or at the end of a programme to re-start the programme.

When a machine according to the invention is intended solely or alternatively for use in teaching simple mathematical facts, for example, multiplication tables and/or simple multiplication, addition, division, subtraction or like "sums" to be learnt "by heart" or calculated in the head, the machine conveniently comprises, in addition to the display apparatus by which a series of questions constituting a main programme of mathematical questions can be displayed in succession, and display apparatus by which the answers to those questions can be selectively displayed, sets of manually operable keys identified by digits and arranged in rows so that a pupil can press in succession the keys representing the answer he wishes to record to each question displayed.

Where a machine of this kind is to be used for alternative purposes, the keys can be identified by replaceable templates placed over the keyboard and bearing identifying figures, letters, words, or other symbols related to the particular subject or matter to be taught.

In any event, the recording of the correct answer entails depressing the correct key or keys and not depressing any inappropriate keys. Thus if any key is depressed in addition to the correct key or keys the machine operates as for the recording of a wrong answer. For example if the machine has three rows of keys on which the pupil can record answers to any mathematical question involving not more than three digits, the correct answer to a particular question is a two digit number and the pupil depresses not only the two keys in the two rows representing the correct answer but a key in the third row in addition, the machine will operate as for a wrong answer. Furthermore, the machine can be arranged so that keys have to be depressed in a particular order, say from left to right across the keyboard in order to record a correct answer so that if a pupil omits a digit in the left-hand column and depresses the correct key in the centre column the machine will record an error.

It will therefore be seen that the machine can be used not only to record answers involving the depression of one or more keys but as a machine of the kind in which the answers to questions are all displayed, each answer is associated with a different single key and the pupil merely selects and operates the key associated with the displayed answer which he thinks is correct.

For this purpose the keyboard can be labelled in any way required. For example the keys could be identified with the names of plants or animals or other objects and pictures of the plants or animals or other objects displayed or indicated in sequence to constitute a "programme" to each question in which the pupil is invited to give the correct answer by depressing the key identified with the name of the plant or animal or object displayed. Alternatively the keys might be identified with letters of the alphabet, possible with two or more letters to each key, somewhat as in telephone dials, and the pupil be invited to spell out on the keys the names or first few letters of the names of the plants, animals or other objects. Further, with such an arrangement, the display by the machine might be supplemented by verbal instructions from an instructor or auxiliary apparatus such as instructions to press the key or keys indicating the name of the flower or other object displayed. In this way the machine can be used by children unable to read.

A simple form of display apparatus for questions or answers may comprise a series of compartments each having an electric lamp in it, the compartments lying behind a transparent or translucent dislay "window" over which can be placed a translucent or transparent template or stencil bearing the questions and/or the answers as the case may be in such positions that they can be displayed selectively by selective illumination of the appropriate lamps and over which may be placed a translucent screen or semi-silvered mirror so that only the selected question is rendered visible by illumination of its lamp at any time and the answer to any selected question is similarly only made visible by illumination of its associated lamp.

The keys in an arrangement of the above kind may operate switches arranged in transmission lines and the question and answer display apparatus may include one or step by step selector devices arranged to display the questions successively in the required sequence and in each position (1) to render the circuit of the appropriate lamp of the answer display apparatus ready for display of the answer and (2) to energise transmission lines associated with the keys the depression of which would record the correct answer, relay apparatus being provided by which only if those keys are depressed will the selector device or devices be moved on one step to display the next question, whereas if any other of the keys are depressed the circuit associated with the selected answer lamp will be energised to display the correct answer while a further relay or relays will bring into operation a further selector device for causing the display of a subsidiary programme of questions including (usually ending with) the wrongly answered question.

While the machine will usually be constructed so that it displays the questions and answers visually, as would be suitable for teaching such things as mathematical facts, spelling, identification of any objects or other matters shown pictorially, alternatively, or in addition the machine may be constructed so that the questions are displayed in audible form, for example in the form of verbal questions recorded on and selectively transmitted from a magnetic tape or the like or in the form of an audible tone or combination or series of tones representing a musical interval, chord, arpeggio or melody recorded on a tape and to be identified by the pupil.

Similarly, the answers may be displayed audibly, as may indications of performance at the end of a sequence, if provided. Thus, with such audibly displayed questions and answers the machine could be employed by blind pupils, as by the placing of characters or words in braille on or beside the keys to be depressed by the pupil and such a machine could be used in the teaching of braille characters not only to the blind but to others who might wish to learn braille.

An example of a teaching machine according to the invention, intended more particularly for teaching simple mathematics is shown diagrammatically in the accompanying drawings in which:

FIGURE 2 is a plan view of a commutator device for use with the machine to make the appropriate connections which provide for the display of the correct answer only if a pupil records a wrong answer and the operation of the machine to display the next question only if the pupil records the right answer, FIGURE 3 is a cross-section in the plane 33 of FIGURE 2, and FIGURES 4a and 4b, 4c and 4d are the four parts, running from left to right, of a complete circuit diagram of the machine.

In the circuit diagram represented by FIGURES 4a, 4b, 4c and 4d the various relay operating coils, (herein for convenience referred to simply as the relays) are identified by letters and the pairs of contacts actuated by each relay are identified by the same letter or letters used to identify the relay, with the addition of a numeral e.g. the relay R actuates pairs of contacts R1, R2 etc. The relay UR actuates pairs of contacts UR1, UR2 etc. Moreover all the relay contacts are shown in the positions they occupy when the relays are de-energised.

Referring now to FIGURES 4a, 4b, 4c and 4d, the apparatus comprises two step by step selector devices indicated generally respectively at SUS and RUS the selector device SUS having an operating device, indicated at SUSa, which moves the selector device on one step when it is de-energised after having been energised while the selector device RUS has a similar operating device RUSa, which when de-energised after it has been energised, moves it on one step.

The selector device SUS which is conveniently of the rotary type, has 26 positions and may for convenience be assumed to have a wiper A which, when the relay contacts R2 are in the position shown, is connected to one side, assumed to be the positive side, of a source of power indicated generally at B, the arrangement being such that as the selector device is moved step-by-step from an initial position (assumed to be that which it occupies in the drawing), the wipe A makes contact in turn with each of 24 contacts constituting a bank of contacts and identified herein for convenience respectively at 1A, 2A, 3A, 4A etc. so as to connect these in sequence to the positive side of the source of power B.

The selector device RUS is that which is brought into operation when an incorrect answer is recorded to any question in a manner hereinafter referred to.

The first 12 contacts 1A to 12A of the selector SUS are connected respectively to 12 transmisison lines indicated generally at C, which in turn are connected respectively through sets of contacts indicated generally at PA1, PA2, PA3, PA4 etc. to relays D, E, F, G, H, I, J, K, L, M, N and O. Thus as the selector SUS moves step-by-step from its initial position with the contacts R2 in the position shown, the relays D, E, F, G, etc. are energised in turn. The relay D is arranged when energised to close 6 pairs of contacts representing switches D1, D2, D3, D4, D5, D6 while the relay E when energised will close 6 pairs of contacts constituting switches E1, E2, E3 etc., the relay F when energised closing 6 pairs of contacts constituting switches F1, F2, F3 etc. throughout the 12 relays D to O.

The contacts closed by the relays D to O are for convenience shown as comprising six banks of contacts, each bank of which comprises one pair of contacts operated by each of the six relays. These banks are identified by the reference numerals 1 to 6 respectively and bank 1 comprises the contacts D1, E1, F1 etc., bank 2 the contacts D2, E2, F2 etc. and so on.

The contacts 13A—24A of the selector device SUS are each interconnected with one of the contacts 1A to 12A of that device the interconnection in the example shown being such that as the wiper A makes contact with the contacts 13A to 24A it will connect in sequence to the positive side of the source of power B the lines C connected to the contacts 1A to 12A in the following order: 6A, 1A, 10A, 8A, 3A, 7A, 12A, 5A, 4A, 2A, 9A, 11A.

The contact 25A is that on which the wiper rests when the selector has completed a sequence of 24 questions. The contact 26 is that on which the wiper rests when the selector has been reset prior to starting a main programme of questions.

The sequence of questions in a programme is also dependent on the state of relay PA, thus when relay PA is energised, contacts PA1 to PA9 cause a rearrangement of the order of the 24 items in the main programme by changing the inter-connection between contacts 1A to 12A of SUS and relays D—O.

The pairs of contacts in the bank 6 when closed connect the positive side of the source of power B respectively to 12 lines indicated at 6A, the pairs of contacts in the bank 5 similarly connect 12 lines 5A respectively to the source of power B (assuming contacts HR3 are closed), the pairs of contacts in the bank 4 when closed similarly connect 12 lines 4A respectively to the source of power B (assuming contacts CR1 or TR3 are closed), the pairs of contacts in the bank 3 when closed are arranged respectively to illuminate in turn through lines 3A twelve lamps indicated at 3B and identified herein as 3B1, 3B2, 3B3 etc. which may be assumed to be behind different panels of a question display device, and the pair of contacts in bank 2 when closed respectively connect a line B to a series of lamps indicated at H and identified herein as H1, H2, H3 etc. (assuming contacts DK3 are closed) assumed to be behind answer panels. The lamps H1, H2, H3 etc. will only be illuminated if relay contacts indicated at DK3 of a relay DK hereinafter referred to, are closed. Finally, the pairs of contacts in bank 1 are arranged respectively to connect lines R to a series of 12 contacts indicated generally at V of a plug and socket device by which if desired the apparatus can be connected to various auxiliary apparatus including sound reproducing apparatus by which questions and answers can be presented audibly instead of or in addition to being displayed by illumination of the lamps 3B1, 3B2, 3B3 etc. or H1, H2, H3 etc. as hereinafter described.

The twelve lines 6A are connected respectively to the twelve input terminals of a commutator device PS1, the twelve lines 5A are connected respectively to the twelve input lines of a commutator device PS2 while the twelve lines 4A are connected respectively to the twelve input terminals of a commutator device PS3. Each of the commutator devices PS1, PS2, PS3 has eleven output lines indicated generally at PS1A, PS2A and PS3A, and has associated with it a selector device which might be in the form of a multiple plug device with inter-connected terminals or a series of selector switches by which in either case the input contacts of the commutator device can be selectively connected in whatever manner is desired to the output contacts. That is to say each input contact is connected by the multiple plug or other device to a selected one of the output contacts.

Each of the output contacts numbered 13–22 of the commutator device PS1 is connected through one of ten lines of PS1A to one of the input contacts O1, O2 etc. of a bank of manually operated switch keys O, each of the output contacts numbered 13–22 of the commutator device PS2 is similarly connected through one of ten lines PS2A to the input contacts P1, P2 etc. of a bank of manually operated keys P, while each of the output contacts numbered 13–22 of the commutator device PS3 is connected through one of ten lines PS3A to one of the input contacts Q1, Q2 etc. of a bank of mannually operated keys Q.

In the example shown in which the machine is, for convenience, assumed to be used for teaching simple mathematical facts such as the multiplication tables, each of the banks of keys O, P and Q contains ten keys, which represent respectively the numerals 0 to 9 and, in practice, will be identified, either temporarily by means of templates or the like or permanently by these numerals, the keys representing the mechanism by which a pupil indicates the answer he wishes to give to any particular question displayed, by depressing the key or keys representing the number he wishes to give as the answer.

Each of the keys O is arranged when depressed to close two pairs of contacts, one of which comprises its input contact O1, O2, O3 etc. and a contact O11 connected to an output line O12 while the other comprises a pair of contacts O13 by which the positive side of the source of power B is connected to an output line O14.

Similarly each of the keys P when depressed connects its input contact P1, P2, P3 etc. to an output contact P11 connected to an output line P12 and also connects the positive side of the source of power B through contacts P13 to an output line P14.

Similarly the depression of each key Q connects its input contact Q1, Q2, Q3 etc. through an output contact Q11 to an output line Q12 and through a pair of contacts Q13 connects the positive side of the source of power B to an output line Q14.

Since the answer to a question may require that keys be depressed in only one or two of the three banks of keys, a further output line is provided from each of the commutator devices PS1, PS2, PS3, at the position numbered 23 in each case. Contact 23 of commutator device PS1 is arranged to be connected to the positive side of the source of power B in a contacts HR3, contact 23 of commutator device PS2 is arranged to be connected to the positive side of the source of power B by contacts CR1 or TR3 while contact 23 of the commutator device PS3 is connected to line Z.

It will be seen that when the main selector SUS occupies any given position one of the question lines 3A will be energised to illuminate a question and assuming the appropriate connections have been made by the commutator device PS1, PS2, PS3 the input contacts O1, P1 and Q1 of the keys representing the correct answer will be connected to the positive side of the source of power. If then the correct keys are depressed in the correct sequence, the output lines O12, P12, Q12 will be connected to the positive side of the source of power B while at the same time the three lines O14, P14 and Q14 will be connected to the positive side of the source of power B.

For convenience, having thus described the main circuit arrangements by which the questions are illuminated in sequence and the appropriate connections made to the input contacts of the banks of keys to cause energisation of the lines O12, P12 and Q12 only if the correct keys are depressed and energisation of the lines O14, P14 and Q14 whether the correct or incorrect keys are depressed, the further elements and features of the machine will now for convenience be described by describing the operation of the machine and referring in such description to the effect and operation of the various relays and other elements incorporated in the circuitry.

As mentioned above the selector SUS has 26 positions, position 26 being the position to which the selector goes after being reset, positions 1 to 24 being used to determine the sequence of questions, while position 25 is reached at the end of a sequence of questions and is the position in which indicator lights (hereinafter referred to) showing the standard of performance of a pupil are illuminated.

The order in which the questions appear is determined by the wiring of bank 1 of the selector SUS and the state of relay PA. Thus, in the first 12 positions of selector SUS the 12 relays D to O are operated in that order via the change-over contacts PA1 to PA9 of a relay PA. The sets of contacts of one of the relays D to O, for each position of the selector SUS connect to the source of power B the circuits of (1) the appropriate question-illuminating light. (2) the appropriate input contacts of the three commutator devices PS1, PS2, and PS3, (3) the appropriate answer light, and (4) one of the contacts in the external socket V.

The machine provides for the pupil one of three routines according to the pupil's performance. In the first routine the questions arise first in numerical order through positions 1–12 of selector SUS and then in haphazard order in positions 13–24. In the second routine the 12 questions are each presented twice in a different haphazard order brought about by operation of relay PA. In the third routine the questions arise in the same order as in routine 2 but timing mechanism is brought into operation through a relay PB so that in this third routine the pupil is informed whether he is fast enough or too slow at the end of the routine, and if correct answers are given but outside a predetermined time, the pupil is informed that he is too slow by indicator lights and he is then presented with subsidiary questions together with the item to which he has responded too slowly inaccordance with a "reinforcement routine."

Thus at position 1 of selector SUS during the first routine the relay D is energised. Question 1 is therefore illuminated by the appropriate contacts in bank 3 and the answer light 1 is selected by the appropriate contact in the bank of contacts 2 but remains "off." At the same time the power supply B is connected through the appropriate contacts of the banks, 4, 5 and 6 to the appropriate input contacts of the three commutator devices PS1, PS2 and PS3, and hence to the appropriate input contacts of the three banks of keys O, P and Q, that is to say to the input contacts of the keys representing the correct answer, assuming that the answer is a three-figure answer, or to the appropriate contacts only of the banks P and Q and to output line O12 should the correct answer only be a two-figure answer, or to the appropriate contact of bank Q and to output lines O12 and P12 should the correct answer be only a single-figure answer.

When any key is depressed it closes two circuits as described above but the construction of the switches is such that one of these circuits is closed before the other. Thus, assuming for convenience that the correct answer is a three-figure answer and that the appropriate contact of one key of each bank has been connected as mentioned to the source of power supply B, the depression of the correct key in the 100's bank O will connect the power supply via its contacts O1 or O2 or O3 etc. to a relay HR. A brief interval of time later the second pair of contacts O13 close connecting the power supply B to line O14 but contacts HR2 being open owing to the energisation of relay HR as above the power supply B remains disconnected from relay ER. At the same time relay ER is of the slow pick-up type so that should contacts HR2 not have opened when line O14 is energised relay ER will remain in the OFF state. If however the incorrect key is depressed in the 100's bank O, the line O14 is energised and operates the relay ER via the contacts HR2.

If the correct key is depressed so that the relay HR is operated, it is locked in the ON position by way of contacts, HR1, SUS3 and RUS3. If the correct key is now depressed in the 10's bank P, the relay TR is thus energised and this opens the contacts TR2 so that the almost simultaneous closing of the contacts P13 is ineffective to energise the line O14. Here again, if the incorrect key is depressed in the 10's bank P the line O14 is energised to operate the relay ER. Assuming that the correct keys have been depressed in the banks O and P, the depression of the correct key in the units bank Q will now energise the relay UR so as to open the contacts UR7 and thus prevent operation of the relay ER by the closing of the contacts Q13, but if the incorrect key is depressed in the bank Q the relay UR will not be operated and hence the closing of the contacts Q13 will energise the relay ER via the line O14.

If the correct keys have been depressed in the correct order in all three banks, the relay UR being thus energised this relay is locked in the ON position by contacts UR1 and the appropriate key contact until the key is released. Provided relay SUR is in the ON position, the energisation of relay UR also causes energisation of the device SUSA through contacts UR4, SUR3, and R1, so asto move the selector on one step as soon as UR is released through the operator releasing the key. On moving forward one step, the selector SUS energises relay E and releases relay D and thereby causes illumination of the next question, and the making of connections to the appropriate contacts of the keys in the three banks, that is to say the contacts O1 etc., P1 etc., Q1 etc. of the keys representing the correct answer to such next question. The depression of the correct keys in the correct order then acts in the same way as described above to cause eventual energisation and de-energisation of relay UR and hence the operation again of the device SUSA to move the selector SUS to the next position, and so on as long as the correct answers are given, while the depression of any incorrect key or a correct key in the wrong order will result in energising the relay ER.

The operation of the device SUSA to move the selector on one step also serves to release the relays HR and TR through opening of the contacts SUS3 or RUS3, e.g. mechanically.

During the display of the questions in the first routine the relays PA and PB are both in the OFF position, and while for convenience above it has been assumed that the selector SUS will be moved on one step each time a correct response is given, which assumption is based on the assumption that a pupil is answering correctly the first sequence of questions, the circuitry includes change-over contacts R1 which determine whether the operating device SUSA will be energised to move the selector SUS on one step or whether the operating device RUSA by which a subsidiary rotary selector device RUS is operated will be energised.

If an incorrect key is depressed it will be seen from the above description that relay ER is operated which in turn operates relay DK through contacts ER1. Relay DK locks on through contacts DK1 and UR5, and thus relay ER also remains locked ON through contacts ER1. Also contacts ER5 close connecting indicator light T6 to the power supply and reveal to the pupil that he has made an error and the contacts DK3 of relay DK close causing the appropriate answer light to be illuminated thus revealing the true answer to the pupil. Provided switch S1/C is in one of its operative positions 2 or 3, the contacts DK2 of relay DK remain locked on through contacts R5 and the third bank of contacts on the device RUS. The intention is that the pupil then depresses the keys representing the correct answer and this causes the relay DK to be released through the opening of contacts UR5, which then also releases relay ER; but if relay R has been energised owing to switch S1/C being in positions 2 or 3, contacts R2 will have transferred the power supply from selector SUS to selector RUS so that a correct response will now cause operation of the selector RUS.

The contacts R3 of the relay R which are thus closed connect the wiper of bank 1 of the selector SUS to selected positions on the selector RUS so that, when relay R is energised, the question to which the pupil made an incorrect response, say question No. 5, which arose through the relay H being energised, will still be illuminated as the first item of the reinforcement routine of questions which the apparatus will now display. Thus, relay H is now connected via the wiper of bank 1 of the contacts of the selector device SUS through the contacts R3 to position 1 of the selector RUS, and since the wiper of the selector RUS is now connected to the power supply B by contacts R2 the relay H will remain energised and the same question lamp will thus remain illuminated. Other positions on the banks 1 and 2 of the selector RUS are connected to selected ones of the relays D to F, these representing easy items at the start of the series.

A switch S1/D selects one or other of the banks 1 or 2 of the selector RUS as the operative bank, the arrangement being such that when the switch S1/D is in position 2 it provides for a reinforcement routine of six questions in which the question to which the wrong answer was given is interspersed with questions previously correctly answered. When the switch S1/D is in position 3 it provides a similar reinforcement routine but of twelve questions in which the question wrongly answered is intermingled with questions previously correctly answered, while when the switch SL1 is in the position 1 the relay R is disconnected from the source of power so that the operating device RUS does not come into operation.

When an incorrect key is depressed and the relay ER is thus energised contacts ER1 operate relay DK, this also causes operation of relay ESR through contacts DK4 of relay DK. A press button BK operable by the pupil to indicate that he does not know the answer to a question displayed, also energises relay ESR by energising relay DK and thus closing contacts DK4. The relay ESR when energised locks in its ON position through contacts ESR1 which are connected via a bridging wiper 3A of bank SUS3 of the selector SUS to the power supply B for positions 1 to 25 of the selector SUS. Thus the relay ESR is only de-energised when the selector SUS reaches position 26. At the end of a sequence of questions, that is to say when the selector SUS reaches the position 25, indicator line S2 is energised through bank SUS 2 of the selector SUS and, depending on whether relay ESR is energised or not and whether either or both of relays PA, PB are energised, and the state of relay TSR, one of five indicator light T1, T2, T3, T4 or T5 is connected to the power supply B. In routine 1 relays PA and PB are both in the OFF state and thus, if no errors have been made by the pupil, indicator T4 will light via contacts PB3, PA10 and ESR3, while if errors have been made indicator light T5 will light owing to ESR3 now being in the energised state.

If the relay ESR is de-energised owing to no errors having been made, a condenser C6 is connected to the power supply B through contacts CC1, ESR3, PA10, PB3. In position 26 of the selector SUS, through which the selector device passes when a "Start" button indicated at S is depressed a relay CC is energised and the charged condenser C6 is connected via the contacts CC1 to the relay PA which is thus energised and locks in its ON position through contacts PA11 and ESR6. The energisation of the relay PA thus causes the contacts PA1 to PA9 to move and change the order of connection of the relays D to O to the contacts 1 to 12 of bank SUS1 of the selector SUS and thus introduce a new sequence of questions in which the order of the 24 questions originally asked in routine 1 is changed. At the same time owing to relay PA being energised either indicator light T1 or T5 is now connected through contacts ESR4, PA10, PB3 to output line S2 and the machine is set for routine 2. Thus on depressing the Start button the pupil proceeds on routine 2.

Should the pupil make any errors during routine 2 or depress the "Don't Know" key, relay PA is released through contacts ESR6 opening, should he make no errors and not have depressed the "Don't Know" key then at the end of the sequence of 24 questions when selector SUS reaches position 25, indicator T1 goes on telling the pupil that he is now to aim at being faster, also a condenser C5 becomes charged via contacts PA12, ESR2, PB2, and, after the Start key is depressed, as selector SUS moves through position 26, energisation of relay CC causes the charged condenser C5 to be switched by contacts CC2 so that it is connected across relay PB thus energising it. Relay PB now locks in the ON state through contacts PB4, ESR6. Movement of contacts PB3 now connects either indicator light T2 or T3 to output line S2 via contacts PB3, ESR5 and TSR2. Opening of contacts PB1 also allows relay SUR to release and brings the timing mechanism into operation so that the machine is now set for timed routine 3. During each of the three routines the indicating lamps T1, T2, T3, T4, T5 which will be illuminated are determined by contacts PB3, PA10, ESR3, ESR4, ESR5 and TSR2. Moreover condensers C5, C6 and a relay CC are provided in order that the relays PA and PB will not change their state when the selector SUS is in position 25, since they would then change the indications of performance of the indicating lamps T1, T2, T3, T4, T5.

The operation of relay ESR, by opening of the contacts ESR6 serves to unlock the relays PA and PB so that, when a wrong key has been depressed or the "Don't Know" button depressed, the machine reverts to the first routine. Contacts R4 of relay R are provided which ensure that following an error the reinforcement routine introduced by operation of the selector RUS is completed before relays PA and PB are de-energised.

When the relay PB is energised the timing mechanism is put in operation in the following manner.

Following pressing of the Start button, relay CC is energised via position 26 of SUS2 (since the selector SUS moves through this position to position 1 when the Start button is pressed). Contacts CC3 then close energising relay URT. Relay URT is a slow release type and during the time that it is in the ON position, a selection of the condensers C1, C2, C3, C4, depending on the positions of the switches S6, S7, S8, S9 are connected via contacts URT2 to the power supply B. When the relay URT moves into its off position whichever of the condensers C1, C2, C3, C4 are in circuit becomes connected via contacts URT2 to the relay SUR thus energising SUR which is held in its on position for a length of time dependent on which of the the condensers C1, C2, C3, C4 are in circuit. Following operation of the correct keys in response to a question, relay URT is energised through contacts UR2 and the above sequence of operations is again started.

The capacities of the condensers C1, C2, C3, C4 in relation to their associated resistances R2, R4 are such as to give release times for the relay SUR of, say, one second, two seconds, four seconds and eight seconds respectively.

Appropriate selection of condensers C1, C2, C3, C4 by switches S6, S7, S8, S9 will thus give release times of from one to fifteen seconds inclusive. While the release times can also be adjusted by adjustment of one or more of the resistances, e.g. the resistance R2 as shown so that by combining appropriate condensers in various combinations and adjusting the resistance R2 any time interval from one to fifteen seconds can be selected. Resistances R4, R5 and R6 limit the current flowing when condensers C1, C2, C3, C4, C5 and C6 are connected to the power supply B. A correct response made while the relay SUR is energised, i.e. a correct response made within the specified time limit connects the power supply through contacts UR4 and SUR3 to selector SUSA or selector RUSA depending on the state of switch R1 thus moving one of the selectors on to display the next question. A correct response made while relay SUR is de-energised, i.e. a correct response made outside the specified time limit connects the power supply B through contacts UR4 and SUR3 to relay TER and also connects the power supply through contacts UR5 and TER3 to the relay R (assuming S1/C to be in position 2 or position 3) so as to introduce the reinforcement routine should the pupil take too long over a response. Thus relay SUR is in the ON state when the timing mechanism is inoperative (through relay PB being OFF and contacts PB1 being closed). When the timing mechanism is operative, selector SUSA or RUSA becomes energised, according to the position of contacts R1, provided the response is made before relay SUR goes to the OFF state. If the correct response is made after, i.e. too slow a response, SUR goes to the OFF state, relay TER is energised through contacts UR4, SUR3, and the uni-selector does not move on a position. The question is represented until the operator makes a quick enough response i.e. until he responds before relay SUR has gone to the OFF state. This happens irregardless of the state of relay R, so that slow responses are speeded up whether in the normal programme or in the reinforcement routine.

Contacts TER4 also cause a relay TSR to be energised, and it then remains locked in its ON position until the selector SUS reaches position 26. At the end of routine 3, therefore, if no errors have been made and the button BK has not been depressed, the lamp T2 or T3 will be illuminated according to the state of the relay TSR, through the contacts TSR2, thus indicating to the pupil whether he has merely made no errors but has taken too long, or has not only made no errors but has answered the questions within a determined period.

The "Start" button U connects contacts 25 and 26 of bank SUS4 of the selector SUS to the operating device SUSA through an interrupter SUS1 so that on operating the "Start" button the selector SUS is automatically moved step-by-step on until it reaches position 1. The reset button indicated at RS closes the circuits of two interrupter devices SUS1 and RUS1 and thus resets both selector devices SUS and RUS through appropriate contacts so that they each move automatically to position 26 at which position contacts SUS2, and RUS2, open. During this period the reset button RS disconnects other circuits so that the circuitry is inoperative as the selector devices move through their intermediate positions into position 26, and release relays PA and PB so that the machine is reset to routine 1.

Bank RUS4 of the selector RUS is employed to cause operation of the device RUSA to move the selector RUS to the next position at the end of a reinforcement routine. Thus, at position 6 of bank RUS3 of the selector device RUS, relay R is released (contacts S1/B being in position 2), and at the same time contact 6 of bank RUS4 of the selector device RUS becomes connected via the interrupter to RUSA so that the selector device RUSA is moved into position 7.

The contacts DK5 of relay DK are used to transmit pulses to apparatus for counting errors through an external plug PS5, while the contacts of plug PS6 are connected to bank SUS5 of the selector SUS so that if desired an external clock can be plugged in to record the length of time taken to complete a series of questions.

As mentioned above the socket device V is for use with auxiliary apparatus including sound reproducing apparatus by which the questions and/or the answers can be spoken instead of or in addition to being illuminated. There is thus included an answer light T8 connected to pin 19 of the device V which is illuminated to indicate that the full question has been asked and the pupil is required to respond. A press button W may also be connected to pins 17 of the device V which can be depressed by the pupil if he wishes to have the question repeated.

Figure 5:
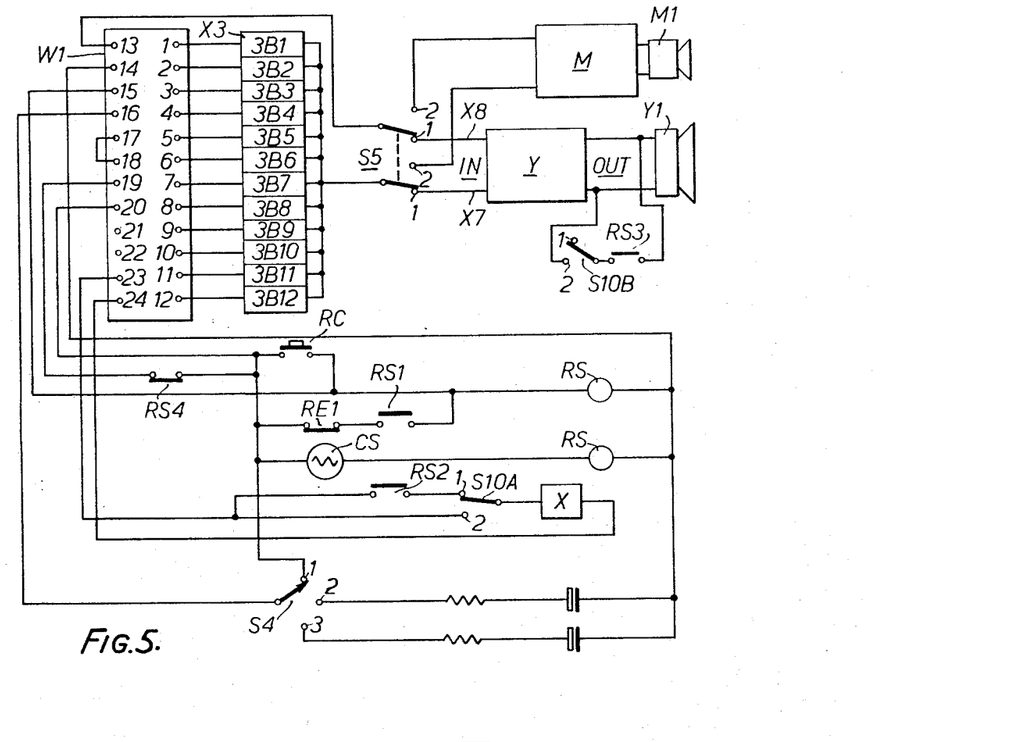
FIGURE 5 is a diagram showing one form of apparatus by which the machine may be caused to display the questions and/or the answers in audible form instead of visibly.
Figure 6:
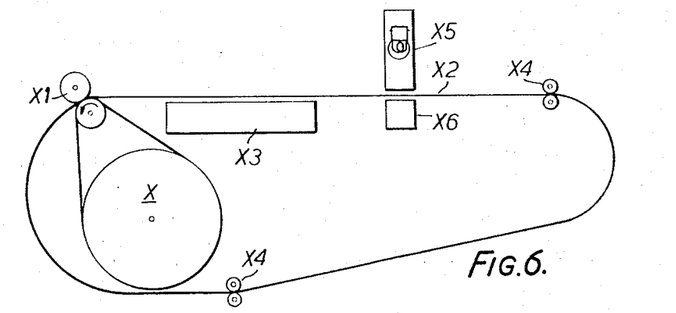
FIGURE 6 is a diagrammatic plan view of tape traversing and pick-up apparatus forming part of the apparatus diagrammatically shown in FIGURE 5.

The sound reproducing apparatus shown in FIGURES 5 and 6 comprises a record having a multiplicity of endless sound tracks, on which sound tracks the questions or the answers, as the case may be are recorded, supporting an operating means for the multi-track record or each multi-track record, pick-up means including a pick-up element arranged to be responsive to the matter recorded on or in each sound track, amplifying an electro-acoustical means and selector means whereby the pick-up elements can be selectively connected to the amplifying and electro-acoustical means while the operating mechanism for the record is rendered operative so as to enable the questions and/or the answers to be selected and made audible at the required times.

Figure 4A:
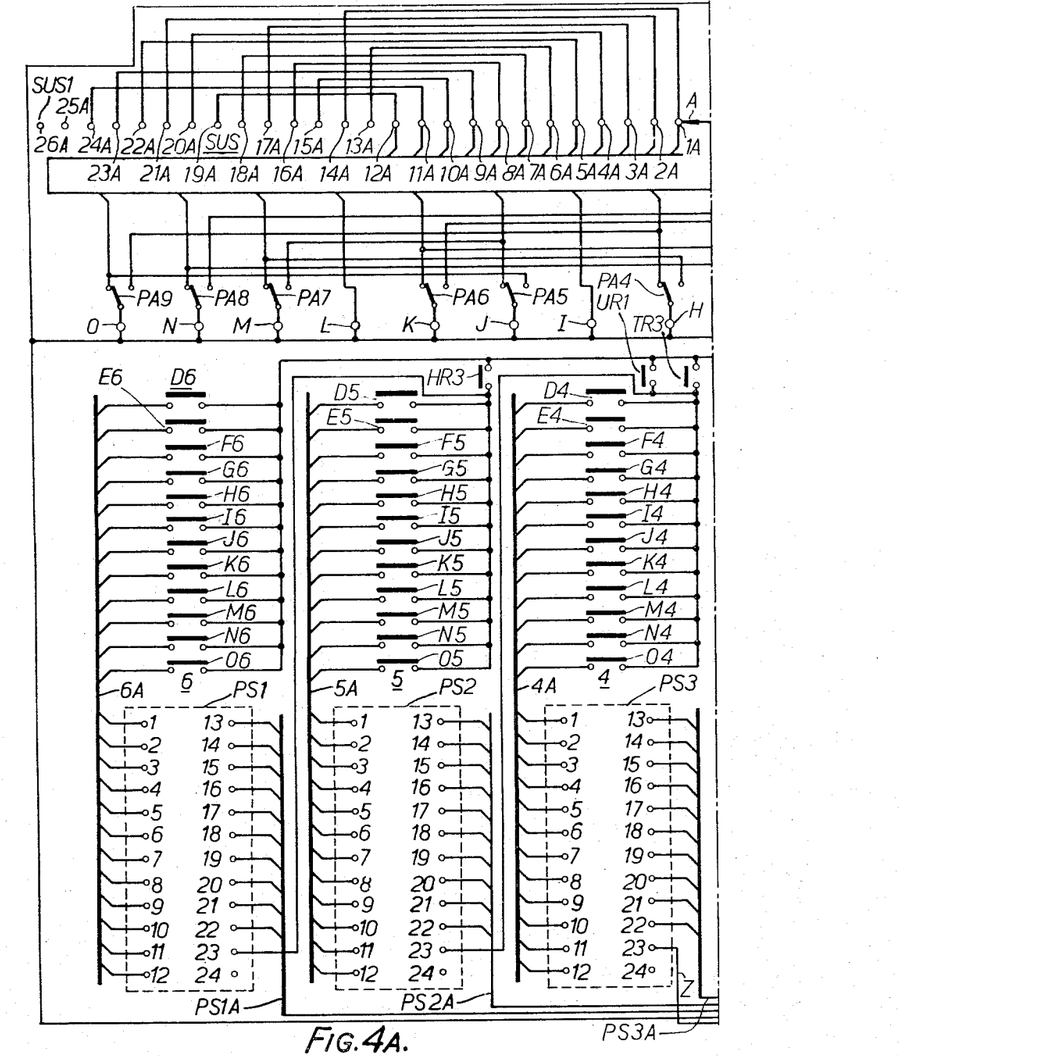
Figure 4B:
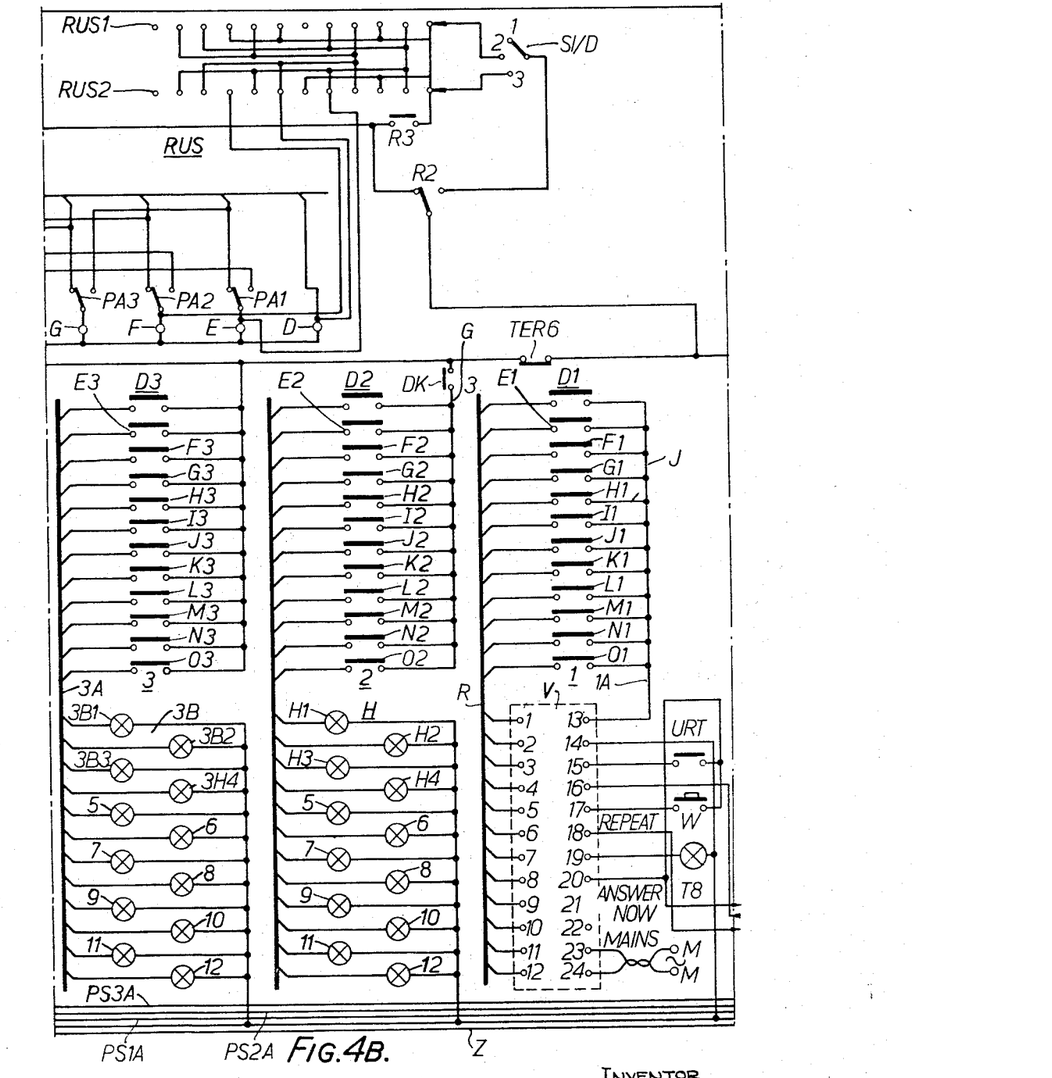
Figure 4C:
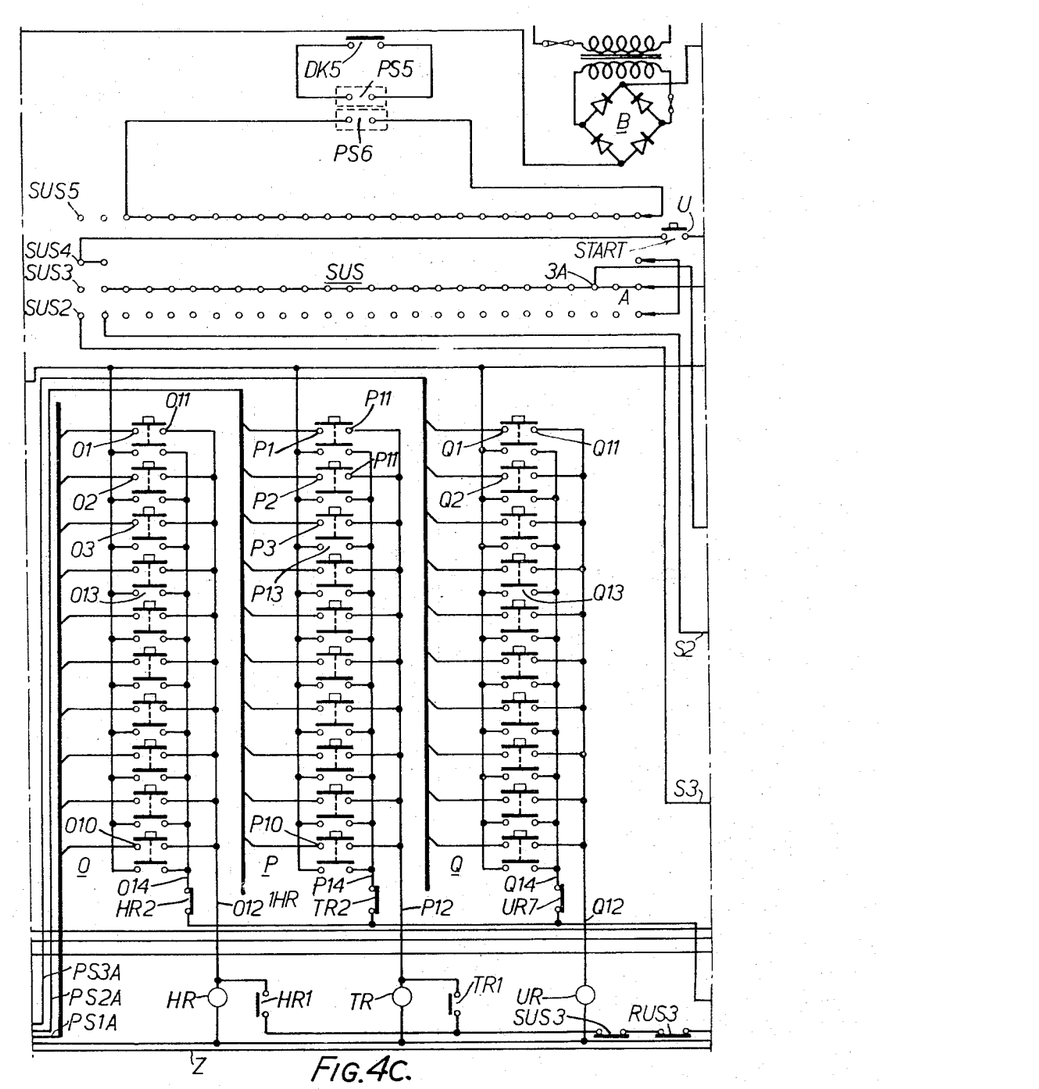
Figure 4D:
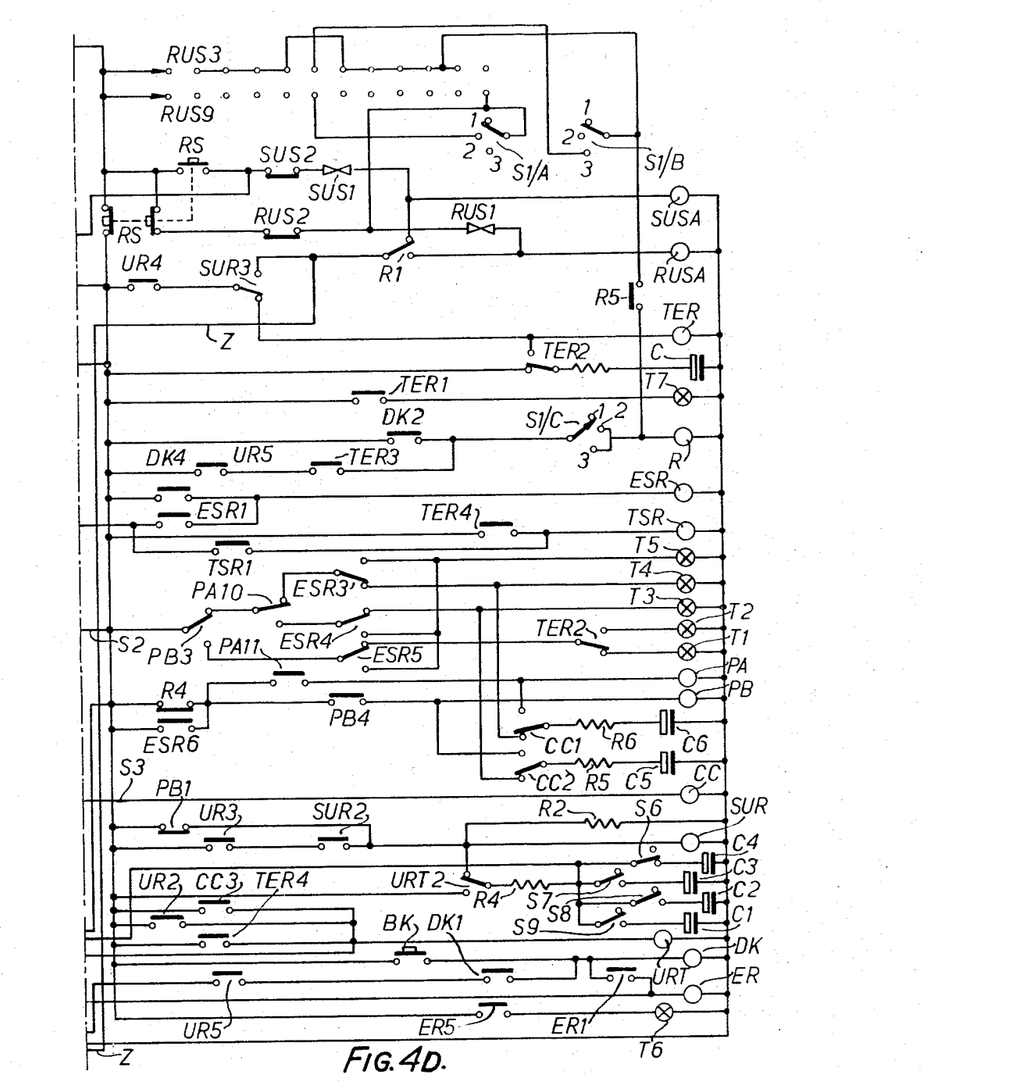

The apparatus comprises a plug device W1 which when the apparatus is to be brought into use is plugged into the socket device V shown in FIGURE 4b so that the contacts 1 to 24 of the socket device engage respectively the contacts 1 to 24 of the plug device W1. Thus contact 13 of the device V is a common contact which becomes connected to one or other or the contacts 1 to 12 depending on which of the contacts D1, E1, F1, G1, etc. have been closed, that is to say on the position of the selectors SUS, RUS and relay R.

The apparatus comprises a relay RS which is arranged to be put into the "on" condition and automatically locked in this position when the relay URT is in the "on" condition, through the appropriate contact 15 of the socket device V or when press button W is pressed (via the appropriate contact on the socket device V). The relay RS is locked "on" through its own contact RS1 and contacts RE1 of a second relay RE and when switch S10A is in the "off" position, the relay RS, when thus placed in its "on" condition, operates through its contact RS2 to bring into operation a motor X which drives the traversing mechanism indicated at X1 of an endless loop of recording tape X2 of 12 track type arranged to pass round a 12 channel pickup head X3 and be readily removable and replaceable in known manner, the loop of tape also passing round guides X4 if desired, one or both of which may be adjustable to allow for different lengths of tape. The tape will have recorded respectively on its 12 tracks the 12 questions to be placed before a pupil using the apparatus.

The recording tape includes an aperture at an appropriate point in its length which in the stationary position of the tape permits the passage of light from a source X5 to a cadmium sulphide cell X6, such passage being interrupted by the initial movement of the tape from its stationary position upon operation of the relay RS. The cadmium sulphide cell X6 is arranged to control the circuit of the relay RS so as to allow this relay to be energised when the tape, having completed one cycle, returns to its initial position so that at the appropriate point in the travel of the tape the cadmium sulphide cell, by reducing its resistance energises the relay RE, which unlatches the relay RS and thus breaks the circuit of the motor X.

Other means may be employed, such for example as a metallic strip on the tape, or a mechanical system such as a notch on the tape, arranged to operate a micro switch at the appropriate point in the travel of the tape in a manner well known per se.

The twelve pick up elements incorporated in the twelve channel pick up head X3 in FIGURE 5 are arranged in circuits which in FIGURE 5 are identified by the same reference letters 3B1, 3B2 etc. identifying the lamps in the corresponding visual display answer apparatus, rendered effective selectively by the selector devices SUS and RUS through the operation of one or other of the relays P to O inclusive. To this end one side of each of the pick up elements is connected to one side X7 of the input circuit of an amplifier Y, the other side X8 of which is connected to the pin 13 of the plug W1 and hence to the common line 1A of the contacts in the bank 1. The output of the amplifier Y is coupled to a loudspeaker or headphones indicated at Y1. When, however, the switch S3B is in position 2 and contacts RS3 are closed, the loudspeaker or headphone device is short circuited thus interrupting the sound. It will be apparent that when any one of the relays in the bank D to O inclusive is selected by the selector devices SUS and energised the appropriate one of the twelve contacts V1–12 will be connected to the common line 1A, thus completing the connection of the input circuit of the amplifier Y to the appropriate one of the twelve pick up units incorporated in the pick up head X3.

It will thus be apparent that upon each movement of the selector device SUS to a new "question" position not only is the appropriate question displayed by illumination of the appropriate one of the lamps 3B1, 3B2, 3B3, etc. but the pick up element 3B1, 3B2, 3B3 etc. responsive to the track on the tape on which that question is recorded is brought into circuit with the input of the amplifier Y and the motor X1 is brought into operation because the question to be "spoken" by the loudspeaker or headphone Y1.

Switch S10 comprises two pairs of contacts S10A, S10B and is provided so that the speech unit may be used in two ways. When switch S10A, S10B is in position 1 the loop of tape makes one circuit so as to ask a complete question and then stops at the end of the question the loudspeaker Y1 being in operation. As soon as the correct answer is made by the pupil the loop of tape makes a fresh circuit and asks a further question. When switch S10 is in position 2, the motor X is no longer started and stopped by contacts RS2 but is left running, so that the question keeps repeating. As soon as the correct answer is given the output of the speaker is muted owing to contacts RS3 closing and being connected (when contacts S10B is in position 2) across the speaker thus short-circuiting it. Contacts RS3 remain closed until the end of the question, since relay RS locks ON through contacts RS1 and RE1 until, at the end of the circuit, relay RS is released through opening of contacts RE1.

Similar means to those described above and shown in FIGURE 5 may be provided for causing the answers to be "spoken" by the loudspeaker or headphones Y1, in which case the answers may be recorded on a separate twelve track tape associated with a separate twelve channel pickup device, a selection of the channel of the device to be rendered operative being effected in the same way and under the same conditions as the lamps H1, H2, H3, etc. of the answer illuminating device H are selected and illuminated in the apparatus H.

Alternatively, the twelve questions and twelve answers might be recorded on a single 24 track recording tape having associated with it one or more pickup devices providing 24 pickup elements arranged to be brought into effective operations selectively in the manner indicated above at the times respectively when the questions or the answers are to be placed before the pupil audibly.

It will thus be seen that by the apparatus shown in FIGURES 5 and 6 the pickup devices 3B1, 3B2, 3B3, etc. are selected to cause the questions to be displayed audibly in the same way as the lamps in the bank 3 are selected to cause questions to be displayed visibly while pickup devices for causing answers to be displayed audibly may also be selected in a similar manner to the selection of the lamps in the bank H which display the answers visibly.

If desired means may be provided by which when any question is selected the tape continues to travel so that the question is repeated audibly until the pupil records the correct answer. The switch S10 is then in its "on" condition so that the motor Y keeps running continuously. When, however, a correct response is made by the pupil the relay RS goes into its "on" condition and causes the sound to be cut off through the action of relay contacts RS3 and, when the tape reaches the end of the loop (that is to say the point between the ends of the sound tracks representing the various questions), relay RS is released through the relay RE going into its "on" condition and the sound is again switched on through the contacts RS3 opening so that the next question is heard.

Provision is made by which an instructor can record his own questions and/or answers upon a tape. To this purpose the switch S5 is placed in position 2 so that the appropriate magnetic recording head is disconnected from the amplifier Y and connected to the output of an amplifier M which has a microphone connected to its input side. Thus, after resetting the machine as a whole and placing appropriate plugs into the commutation devices PS1, PS2, PS3, and placing switch 55 in position 2, depression of the start button will cause the appropriate recording head to be connected to the output of the amplifier M. When a key RC is then depressed relay RS is energised and the motor X is put into operation, whereupon while the tape is making its circuit the relevant question is spoken into the microphone so as to be recorded on the appropriate channel of the tape. After the tape has completed its circuit the correct answer to the question recorded is then put on the machine by depressing the appropriate keys whereupon the machine switches to recording head 3B2, the tape begins a fresh circuit during which the second question is recorded, and so on. When all twelve questions have been recorded in this way switch 55 is then moved into position 1 and the machine is ready for use.

Figures 2, 3:
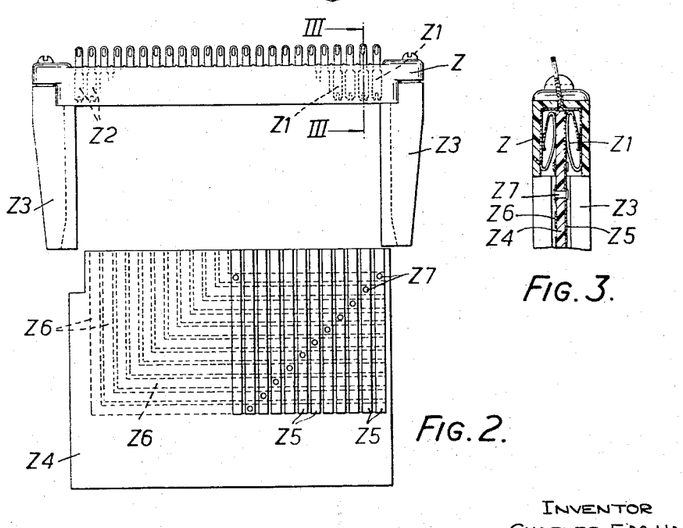

In FIGURE 4a the commutator device PS1, PS2 and PS3 are assumed to be multiple socket devices into each of which is inserted a plug device comprising 24 contacts so interconnected so as to provide the appropriate connections within the machine for the questions and answers to be displayed. FIGURES 2 and 3 illustrate a practical form of commutator device particularly suitable for making such connections and permitting with a standard lay-out of connecting strips in connection of the contacts 1 to 12 of either of the devices PS1, PS2 or PS3 respectively into the contacts 13 to 24 of the device in any manner desired. The commutator device comprises a fixed channel like housing Z supporting within the channel pairs of spring contacts Z1, Z2, there being twenty-four such pairs of contacts, each pair being interconnected with one another but separate from the other pairs and the pairs of contacts Z1 being the contacts 1 to 12 of the device PS1, and being the twelve pairs of contacts at one end of the row of contacts while the contacts Z2 are the contacts 13 to 24 of the same device and are the twelve pairs of contacts at the other end of the row. Rigidly secured to the ends of the housing Z are two channel-like guide members Z3 between which can be slid a selector plate Z4 which has on one face of it twelve spaced straight conducting strips Z5 and on the other face of it twelve L shaped conducting strips Z6, the ends of the conducting strips Z5 being disposed so as to make contact with the pairs of contacts Z1 when the selector plate Z4 is slid between the guides Z3, into a position in which the appropriate edge lies between the pairs of contacts Z1 and Z2 as shown in FIGURE 3 while the ends of the contacts Z6, when the selector plate is in this position may contact with the pairs of contacts Z2.

The selector plate Z4 is itself made of insulating material and each of the contacts Z5 is electrically connected to a selected one of the contacts Z6 by a rivet or the like Z7, passing through the appropriate two conducting strips Z5 and Z6 in the area where they cross one another in the manner indicated in FIGURE 2. It will thus be seen each of the conducting strips Z5 can be connected to any selected one of the conducting strips Z6 by the placing of the rivet Z7 in the area where the two conducting strips cross one another.

Figure 1:
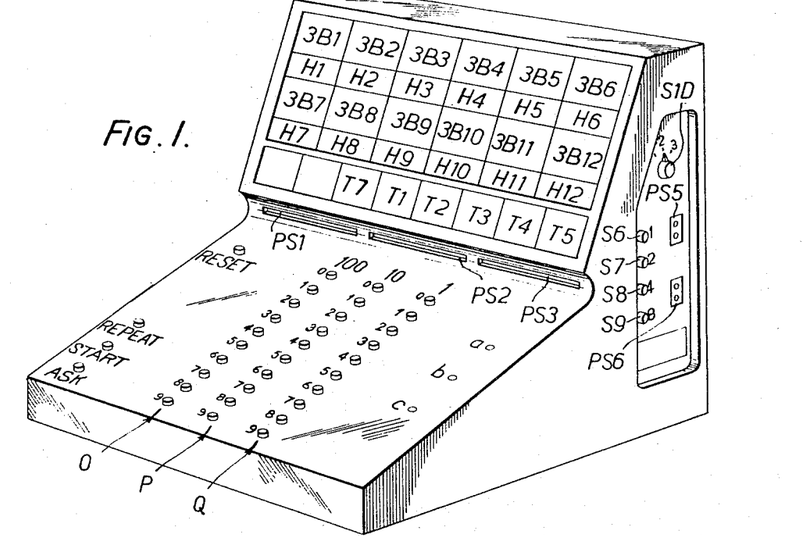
FIGURE 1 is a general perspective view of the exterior of the machine showing the various manually operated keys and switches, and visual question and answer display apparatus.

In the construction shown in FIGURE 1 the various switches and keys are appropriately identified, the arrangement being such that the correct answers when required are displayed immediately below the questions to which they apply. Thus, in FIGURE 1 the lamps 3B1 3B2, etc. would illuminate the sections of the display panel identified by these reference numerals in FIGURE 1 while the lamps H1, H2, H3, etc. would illuminate the areas of the display panel identified by the corresponding reference letters in FIGURE 1. The spaces below the spaces for illumination of the questions and answers may be illuminated by the lamps giving various indications of performance, for example those to which the reference numerals identifying these lamps are applied.

The "captions" to be applied to the various display spaces below the questions and answer display spaces may vary and may be applied by means of appropriate stencils or transparencies.

The questions together with their appropriate answers would conveniently be applied to a stencil or the like having in front of it an appropriate type of semi transparent or translucent material so that the questions and answers cannot be seen until the lamp behind any question is illuminated. Thus the series of stencils bearing the questions and answers may be provided as, for example a series covering the multiplication table up to or to any desired degree beyond the twelve times table.

What I claim as my invention and desire to secure by Letters Patent is:

1. A teaching machine comprising a main program selection apparatus operative to select a first sequence of questions to be presented to a pupil, a question presentation apparatus for presenting said first sequence of questions to said pupil, manually operable switch means for actuation by said pupil for recording his selected response to each question in said sequence, means for interrupting said first sequence in response to the improper actuation of said manually operable means thereby indicating a missed question, said interrupting means including answer presentation apparatus for presenting the correct answer to said pupil to the missed question in said first sequence, a subsidiary program selection apparatus operative to select a second sequence of questions, said question presentation apparatus being operative to present said second sequence of questions to said pupil in response to proper actuation of said manually operable means to indicate the answer to said missed question, said second sequence of questions including said missed question, and means to reinstate the presentation of said first sequence of questions by said question presentation apparatus.

2. A teaching machine as claimed in claim 1 wherein said interrupting means is operative to interrupt said second sequence in response to the improper actuation of said manually operable means thereby indicating a missed question in said second sequence and wherein is provided an additional subsidiary program selection apparatus operative to select a third sequence of questions, said question presentation apparatus being operative to present said third sequence of questions to said pupil, said third sequence of questions including said missed question.

3. A teaching machine as claimed in claim 1 wherein said second sequence of questions consists of correctly answered questions of said first sequence of questions and terminates with the missed question.

4. A teaching machine as claimed in claim 1 wherein is further provided a timing mechanism set for a predetermined time, said timing mechanism being actuated in response to the presentation of each question by said question presentation apparatus and indicating means for indicating the condition wherein the time taken by said pupil for answering a question is greater than said predetermined time.

5. A teaching machine as claimed in claim 1 wherein is further provided record apparatus bearing a plurality of sound tracks of said questions and answers, and wherein said main program selection apparatus and said subsidiary program selection apparatus is operative to select the appropriate sound track for said first and second sequence of questions, respectively, said question presentation apparatus including means to present said questions in sound to the pupil, said answer presentation apparatus including means to present the answers in sound to the pupil.

6. A teaching machine as claimed in claim 1 wherein said manually operable means includes a series of manual keys, a series of electric switches interconnected with the respective keys, and said main program selection apparatus includes electric circuit means for actuation by said electric switches on actuation of the proper keys indicating a correct answer whereby said program selection apparatus is stepped forward one position so that said question presentation apparatus can present the next question to the pupil.

7. A teaching machine comprising a main program selection apparatus operative to select a first sequence of questions to be presented to a pupil, a question presentation apparatus for presenting said first sequence of questions to said pupil, manually operable switch means for actuation by said pupil for recording his selected response to each question in said sequence, means for interrupting said first sequence in response to the improper actuation of said manually operable means thereby indicating a missed question, said interrupting means including answer presentation apparatus for presenting the correct answer to said pupil to the missed question in said first sequence, a subsidiary program selection apparatus operative to select a second sequence of questions, said question presentation apparatus being operative to present said second sequence of questions to said pupil in response to proper actuation of said manually operable means to indicate the answer to said missed question, said second sequence of questions including said missed question, means to reinstate the presentation of said first sequence of questions by said question presentation apparatus, said manually operable means including a series of manual keys, a series of electric switches interconnected with the respective keys, said main program selection apparatus including electric circuit means for actuation by said electric switches on actuation of the proper keys indicating a correct answer whereby said program selection apparatus is stepped forward one position so that said question presentation apparatus can present the next question to the pupil, said electric circuit means including at least one commutation device and at least one associated relay device, a series of input lines connecting said switches to said commutator through said relay device, a series of output lines connecting said commutator to said selection apparatus, and a source of electrical power, said commutator including means to connect one of said input lines to one of said output lines whereby said source of power is connected to said selection apparatus to actuate the same on proper actuation of said keys indicating the correct answer.

8. A teaching machine as claimed in claim 7 wherein said electric circuit means includes a separate commutator device and associated relay device for each of said questions in said main program, said relay devices having at least the same number of contracts as the number of digits required for answering any question in said main program, said relay devices being responsive to a different question to energize the appropriate input lines of said commutator device, whereby said connecting means in said commutator device is effective to actuate said selection apparatus through said contacts in the corresponding relay device.

9. A teaching machine as claimed in claim 8 wherein said keys are arranged in three separate banks representing hundreds, tens and units digits, each of said relays having five pairs of contacts, three of said pairs of contacts serving to energize the contacts of the proper keys in said three banks and the remaining two pairs of contacts serving to actuate said question presentation apparatus and for conditioning said answer presentation apparatus for actuation.

10. A teaching machine as claimed in claim 9 wherein is further provided disabling means for disabling said answer presentation apparatus upon proper actuation of said keys indicating a correct answer.

11. A teaching machine as claimed in claim 1 wherein said interrupting means includes additional manually operable means for actuation by said pupil indicating that the proper answer is not known, said additional switch means being connected to said answer presentation apparatus to actuate the same to present the correct answer and to said subsidiary program selection apparatus to select a second sequence of questions to be presented.

References Cited by the Examiner

UNITED STATES PATENTS

| | | | |
|---|---|---|---|
| 2,983,053 | 5/1961 | Bartholomew et al. | 35—9 |
| 3,121,959 | 2/1964 | Uttal | 35—9 |
| 3,123,920 | 3/1964 | Crowder et al. | 35—9 |
| 3,141,243 | 7/1964 | Chapman et al. | 35—9 |

EUGENE R. CAPOZIO, *Primary Examiner.*

R. E. KLEIN, *Assistant Examiner.*